(12) United States Patent
Schemmann

(10) Patent No.: US 9,559,780 B2
(45) Date of Patent: Jan. 31, 2017

(54) EXTERNALLY MODULATED OPTICAL TRANSMITTER WITH CHIRP CONTROL

(71) Applicant: ARRIS Solutions, Inc., Suwanee, GA (US)

(72) Inventor: Marcel F. Schemmann, Limburg (NL)

(73) Assignee: ARRIS Enterprises, Inc., Suwanee, GA (US)

(*) Notice: Subject to any disclaimer, the term of this patent is extended or adjusted under 35 U.S.C. 154(b) by 93 days.

(21) Appl. No.: 14/201,682

(22) Filed: Mar. 7, 2014

(65) Prior Publication Data
US 2014/0255045 A1    Sep. 11, 2014

Related U.S. Application Data

(60) Provisional application No. 61/774,011, filed on Mar. 7, 2013.

(51) Int. Cl.
*H04B 10/04* (2006.01)
*H04B 10/588* (2013.01)

(52) U.S. Cl.
CPC .................. *H04B 10/588* (2013.01)

(58) Field of Classification Search
CPC ........................ H04B 10/588; H04B 10/5161
USPC ........................................ 398/183, 185, 193
See application file for complete search history.

(56) References Cited

U.S. PATENT DOCUMENTS

| | | | | |
|---|---|---|---|---|
| 550,667 A | * | 12/1895 | White ...................... | A21C 5/00 425/225 |
| 5,166,509 A | * | 11/1992 | Curran ............... | H04B 10/5051 250/205 |
| 5,550,667 A | * | 8/1996 | Krimmel ............ | H04B 10/2537 398/193 |
| 5,850,305 A | * | 12/1998 | Pidgeon ............. | H04B 10/5051 372/32 |
| 6,178,026 B1 | * | 1/2001 | Yoshida ............. | H04B 10/2507 398/161 |
| 6,583,910 B1 | * | 6/2003 | Satoh ............... | H04B 10/07955 359/239 |
| 6,687,466 B1 | * | 2/2004 | Chiappetta ........... | H04B 10/504 330/149 |
| 8,391,724 B2 | * | 3/2013 | Aruga ................ | H04B 10/5053 359/238 |
| 8,718,484 B2 | * | 5/2014 | Dallesasse ........... | H04B 10/504 398/182 |
| 8,989,600 B2 | * | 3/2015 | Nakamoto .......... | H04B 10/5051 359/238 |
| 9,059,801 B1 | * | 6/2015 | Blauvelt ................. | H01S 5/026 |
| 2002/0071454 A1 | * | 6/2002 | Lin ..................... | H01S 3/06791 372/6 |
| 2004/0156643 A1 | * | 8/2004 | Frederiksen, Jr. . | H04B 10/2537 398/192 |

(Continued)

*Primary Examiner* — Ken N Vanderpuye
*Assistant Examiner* — Amritbir Sandhu
(74) *Attorney, Agent, or Firm* — Stewart M. Wiener

(57) ABSTRACT

An optical transmitter includes a laser and an external modulator that is used to modulate the optical signal using amplitude modulation (AM). The AM is accompanied by frequency modulation (FM) of the output signal that is generally detrimental to system performance. Both the laser and the modulator are driven by an RF input signal, where part of this RF signal is common. By adjusting the relative drive signals the FM response to the modulator drive signal can be cancelled by a laser drive signal or adjusted to a preferred value.

19 Claims, 4 Drawing Sheets

(56) References Cited

U.S. PATENT DOCUMENTS

| | | | |
|---|---|---|---|
| 2004/0161249 A1* | 8/2004 | Suda | H04B 10/503 398/198 |
| 2004/0190904 A1* | 9/2004 | Noguchi | H04J 14/0206 398/85 |
| 2005/0254825 A1* | 11/2005 | Bai | H04B 10/0775 398/155 |
| 2007/0206961 A1* | 9/2007 | Iannelli | H04B 10/505 398/188 |
| 2008/0130083 A1* | 6/2008 | Yasuda | H04B 10/588 359/238 |
| 2008/0130696 A1* | 6/2008 | Shahine | H01S 5/0265 372/38.02 |
| 2008/0193143 A1* | 8/2008 | Mahgerefteh | H04B 10/25137 398/183 |
| 2009/0110408 A1* | 4/2009 | Dallesasse | H04B 10/504 398/185 |
| 2009/0123162 A1* | 5/2009 | Tanaka | 398/183 |
| 2009/0232517 A1* | 9/2009 | Farina | H04B 10/50572 398/183 |
| 2009/0324255 A1* | 12/2009 | Nakamoto | H04B 10/564 398/198 |
| 2010/0254717 A1* | 10/2010 | Miller | H04B 10/564 398/195 |
| 2010/0315018 A1* | 12/2010 | Then | H04B 10/588 315/291 |
| 2013/0215918 A1* | 8/2013 | Wilkinson | H01S 3/1303 372/29.022 |
| 2014/0140699 A1* | 5/2014 | Eiselt | H04B 3/32 398/65 |
| 2014/0204363 A1* | 7/2014 | Slotwinski | G01S 17/325 356/5.09 |
| 2014/0269792 A1* | 9/2014 | Ota | H01S 3/11 372/25 |
| 2014/0270807 A1* | 9/2014 | Hutchinson | H04B 10/532 398/184 |

* cited by examiner

EXTERNALLY MODULATED OPTICAL TRANSMITTER WITH CHIRP CONTROL

PRIORITY

This application claims the priority under 35 USC §119 of Provisional Application 61/774,011 entitled "Optical Transmitter with AM and FM modulation" filed on Mar. 7, 2013 having Marcel Schemmann as inventor. Application 61/774,011 is herein incorporated by reference in its entirety.

BACKGROUND

Directly modulated lasers are susceptible to noise and distortions. Lasers that utilize amplitude modulation (AM) produce a light output that includes high frequency modulation (FM). The FM causes many unwanted system performance issues when light is transmitted over long optical fibers. This stems from the chromatic dispersion of optical fibers and from Rayleigh backscatter on optical fibers. The chromatic dispersion of fibers causes signals from an FM optical source to be dispersed in time as each signal component travels at a different speed corresponding to its momentary optical frequency which varies as the source is FM. Due to signal re-reflection in the fiber due to Rayleigh backscatter at density fluctuations in the fiber the optical signal at the output end of a fiber contains not only the intended signal but also time delayed versions of itself due to the re-reflection.

If the light source includes FM then these signals arrive at the detector, located at the end of the fiber, with different optical frequencies. Optical signals with different frequencies beat at the detector to produce RF signal frequencies equal to the difference of the frequencies in the optical domain. Thus unwanted RF signals are put out of the detector in addition to the wanted signal that give rise to noise and distortions.

Externally modulated transmitters may be utilized to modulate the light output of a laser. The transmitters may utilize AM to transmit the light output so the transmitted light includes very little FM. By using an externally modulated transmitter the problems noted above with directly modulated lasers are avoided because the laser itself is not modulated and therefore there is no FM generated in the laser. The modulator is driven by an RF signal. The modulator output is an AM version of the laser light. Depending on the modulator type this signal is free of FM or deliberately contains a small amount of FM that can be in-phase or counter-phase to the AM. Such small amounts of FM can in some cases be beneficial for system performance.

An externally modulated transmitter is expensive as it requires a separate laser and modulator. However an integrated laser/modulator chip is more cost effective. In such a device both a laser and a modulator section are integrated onto a single chip and if perfectly implemented the FM response is negligible. In practice however there are technological limitations that cause small reflections from the modulator section back into the laser. When the modulator is driven with a signal the magnitude of these reflections changes and this affects the laser operating condition such that the laser generates a small amount of FM. This problem is greater when the device is designed for high output power operation, such as in analog applications, because the laser output mirror (can be a grating) is designed to couple a large fraction of light out of the laser into the modulator section. Therefore the laser itself becomes more susceptible to light reflected from the modulator section in high power devices. High power devices however are important in analog applications. The resulting FM can be in-phase with the AM from the modulator or in counter phase, this depends on the nature of the reflections into the lasers and is difficult to control.

In an analog transmission system the resulting laser FM leads to noise and distortions at the receiver. Depending on device batch this noise can be negligible or severe and sorting of devices is needed to ensure adequate system performance. This negatively affects yield and production throughput.

In many transmission systems use is made of high-frequency modulation of the laser to obtain an FM output with a number of peaks in the optical spectrum. Thus, the power of the laser is spread over the peaks such that individual peak power is reduced. This limitation in individual peak power is useful to permit high launch power into optical fibers that would otherwise reflect this power due to SBS (Stimulated Brillouin Backscattering). The modulation of the laser is chosen such that the FM does spread the laser power over multiple peaks but does not detrimentally affect the noise or distortion performance of the transmission link. Similarly in some cases a low frequency modulation is added to the laser, also designed not to detrimentally affect the system performance.

FIG. 1 illustrates a block diagram of an example externally modulated optical transmitter 100. The externally modulated optical transmitter 100 includes a laser 110, a modulator 120, a modulation source 130, a pre-distortion circuit 140, and a modulator bias circuit 150. The laser 110 is to generate light and is operated at a bias point. The modulation source 130 is to add FM to the light generated by the laser 110 to suppress SBS and thus permit higher fiber launch power. The modulator 120 is to modulate the light from the laser 110 over a fiber 190 and is operated at a bias point. The pre-distortion circuit 140 is to generate uneven distortion orders that compensate for the S-curve (nearly symmetric around the bias point) of the modulator 120. The pre-distortion circuit 140 is driven by an input signal 160, such as a radio frequency (RF) signal, that may be initially provided to an amplifier 170. The modulator bias circuit 150 is to set the bias point of the modulator 120 at the center of the S-curve such that even order distortions are negligible. The output of the pre-distortion circuit 140 and the output of the modulator bias circuit 150 are combined, for example by a summer 180, and the resulting combination is provided as an input (e.g., control signal) to the modulator 120. The output of the modulator 120 (modulated light) is provided to the fiber 190.

By design the modulator 120 is preferably built to have negligible FM or a small amount of desired FM that can be in-phase or counter-phase to the AM of the modulator 120. However, in reality the modulator 120 may generate FM in response to the input signal 160 and the FM response (chirp) may be difficult to control. The externally modulated optical transmitter 100 does not have a means to reduce or adjust the chirp of the modulator 120 at the optical output. If the chirp of the modulator 120 is greater than desired, and the FM is included in the light transmitted over the fiber 190 it may result in noise and distortions and cause many unwanted system performance issues.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Providing the input signal 160 to the laser 110 in addition to the modulator 120 provide a means to control the chirp of an externally modulated optical transmitter. Like the modulator 120, the laser 110 may generate FM (chirp) in response to the input signal 160. The chirp of the laser 110 may be able to reduce or cancel the chirp from the modulator 120 so that the overall chirp of the externally modulated optical transmitter can be negligible, in-phase or in counter-phase relative to the AM signal. The input signal 160 can be inverted, filtered, attenuated or delayed as needed prior to being provided to the laser 110 to obtain the desired characteristics. The amplitude of the input signal 160 may also be adjusted before it is provided to the laser 110 so that the amount of residual FM (chirp) can be controlled as needed for optimum system performance.

Figure 1:
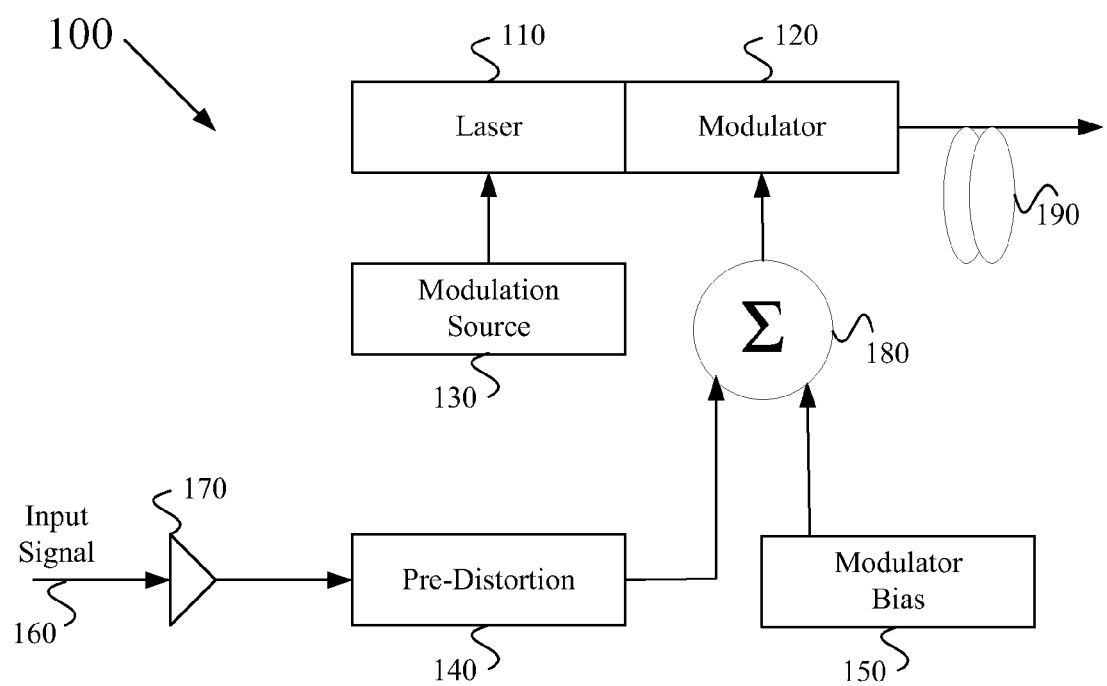
FIG. 1 illustrates a block diagram of an example externally modulated optical transmitter.
Figure 2:
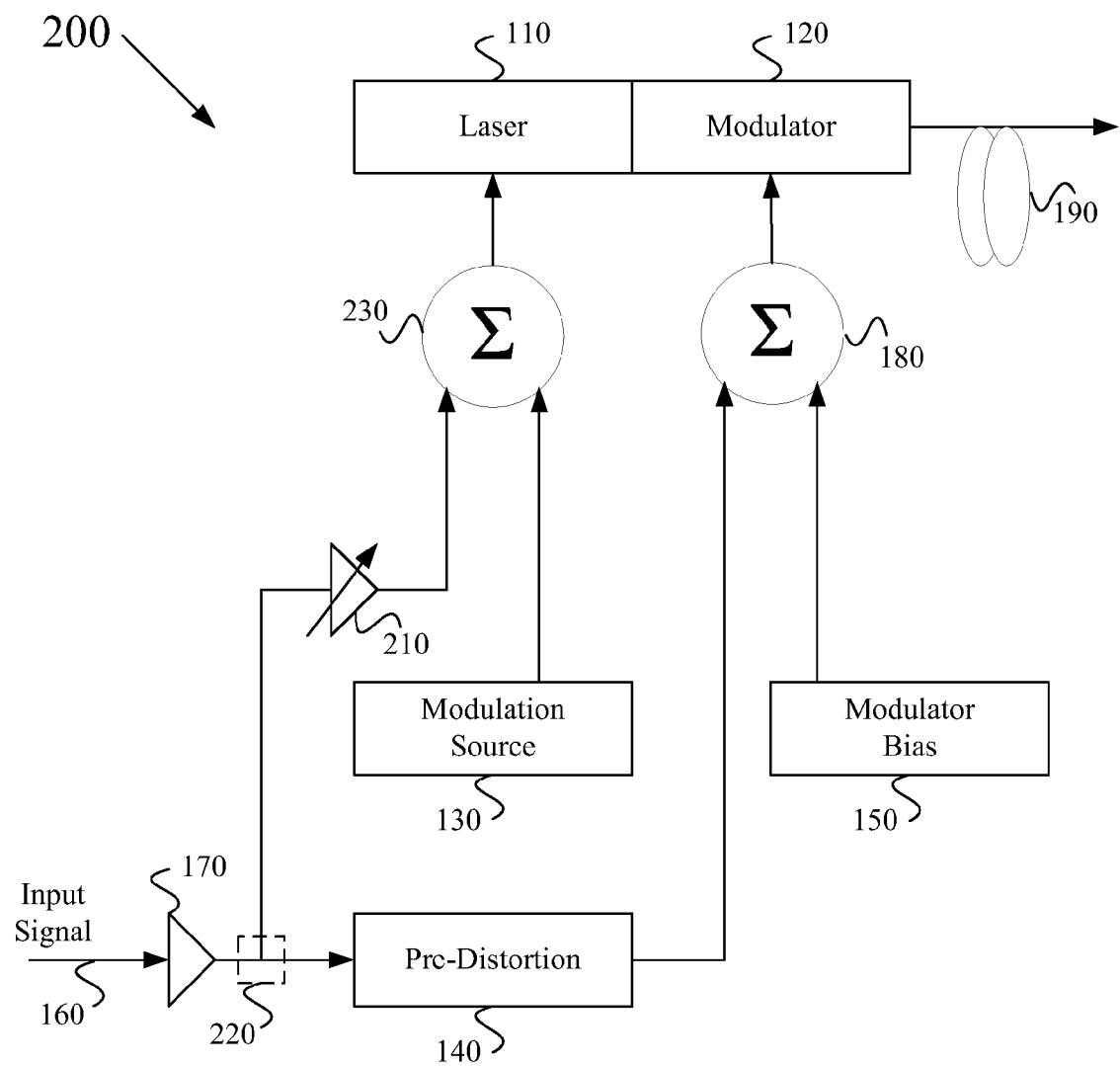
FIG. 2 illustrates a block diagram of an example externally modulated optical transmitter with chirp control, according to one embodiment.

FIG. 2 illustrates a block diagram of an example externally modulated optical transmitter with chirp control 200. The optical transmitter 200 includes the laser 110, the modulator 120, the modulation source 130, the pre-distortion circuit 140, the modulator bias circuit 150, and a level controller 210. The level controller 210 is to adjust the input signal 160 that is provided to the laser 110. The adjustments provided by the level controller 210 may include, for example, filtering the signal for certain frequencies, adjusting the phase of the signal, inverting the signal and/or controlling the amplitude of the input signal 160. The input signal 160 may be initially provided to the amplifier 170. The input signal 160 may then diverge on a first path to the modulator 120 via the pre-distortion circuit 140 and the summer 180 and a second path to the laser 110 via the level controller 210 and a summer 230. The optical transmitter 200 may include a splitter 220 to provide the input signal 160 to the first and second path. The output of the level controller 210 (adjusted input signal) and the output of the modulation source 130 are combined, for example by a summer 230, and the resulting combination is provided as an input (e.g., control signal) to the laser 110.

The laser has an FM response (FM_laser_m) for a given AM modulation index (m_laser). The magnitude of the FM created by the laser (FM_laser) is the product thereof, such that FM_laser=FM_laser_m*m_laser. The modulator has an FM response (FM_mod_m) for a given AM modulation index (m_mod). The magnitude of the FM created by the modulator (FM_mod) is the product thereof, such that FM_mod=FM_mod_m*m_mod. The total FM (FM_total) created by the optical transmitter 200 is the sum of the FM_laser and FM_mod, such that FM_total=FM_laser+FM_mod=(FM_laser_m*m_laser)+(FM_mod_m*m_mod).

In order to have zero FM_total, FM_laser and FM_mod need to cancel each other out such that (FM_laser_m*m_laser)=(FM_mod_m*-m_mod), the minus sign representing a sign inversion of drive signals.

The m_laser value can be selected by the level controller 210 such that m_laser=-m_mod*FM_mod_m/FM_laser_m.

The FM_laser_m is larger in comparison to the FM_mod_m. Accordingly, to have zero FM_total, m_laser is going to be smaller in comparison to m_mod. For example, for a modulation frequency on the order of 200 MHz, the FM_laser_m may be 100 times greater than the FM_mod_m, such that FM_laser_m=100*FM_mod_m. In this example, m_laser would be 1% of m_mod, such that m_laser=-0.01*m_mod. In this example, assuming FM_mod_m and FM_laser_m are not inverted, the level controller 210 may invert the input signal 160 and reduce the amplitude thereof to 1% in order to provide an adjusted input signal to the laser 110 that generates FM (chirp) to offset the FM (chirp) generated by the modulator 120 based on the input signal 160.

In order to ensure that FM_laser and FM_mod cancel each other out, apart from the required sign inversion the phase of FM generated by the laser (phase_FM_laser) should be aligned with the phase of FM generated by the modulator (phase_FM_mod), such that phase_FM_laser=phase_FM_mod. The phase_FM_laser is the sum of the phase of the FM response of the laser (phase_FM_laser_m) and the phase of the drive signal to the laser (phase_m_laser), such that phase_FM_laser=phase_FM_laser_m+phase_m_laser. The phase_FM_mod is the sum of the phase of the FM response of the modulator (phase_FM_mod_m) and the phase of the drive signal to the modulator (phase_m_mod), such that phase_FM_mod=phase_FM_mod_m+phase_m_mod. Apart from the required sign inversion the phase of the laser drive signal phase_m_laser value can be selected such that phase_m_laser=phase_FM_mod_m+phase_m_mod-phase_FM_laser_m.

By way of example, if phase_m_mod is zero, phase_FM_mod_m equals 45 degrees and phase_FM_laser_m equals 90 degrees, phase_m_laser would be -45 degrees. In this example, the level controller 210 may delay the phase input signal 160 by 45 degrees in order to provide an adjusted input signal to the laser 110 that generates FM (chirp) in phase alignment with the FM (chirp) generated by the modulator 120 based on the input signal 160.

The ratio between m_laser and m_mod required to cancel the total FM response is generally frequency dependent. Additionally, any phase adjustments required between laser and modulator drive signals to align the resulting FM and achieve the best FM cancellation are generally frequency dependent.

The m_laser value for FM cancellation is thus a frequency dependent function, such that m_laser(f)=m_mod(f)*FM_mod_m(f)/FM_laser_m(f). The phase_m_laser value for FM alignment is also a frequency dependent function, such that phase_m_laser(f)=phase_m_mod(f)+phase_FM_mod_m(f)-phase_FM_laser_m(f).

The laser 110 may be only capable of providing desired values of m_laser(f) and/or phase_m_laser(f) for an input signal having certain frequencies. The laser 110 may be capable of more control of the RF generated (chirp) based on an input signal at certain frequencies while other frequencies may not be capable of as much control of the chirp. The level controller 210 can filter the input signal 160 to provide frequencies thereof that provide the desired results.

Due to the fact that both the laser 110 and the modulator 120 are driven with the same RF signal at least a second order distortion component will be generated from this joint modulation. The optical transmitter 200 therefore needs to be equipped with means to cancel this distortion. The pre-distorter circuit 140 and/or the modulator bias circuit 150 are capable of canceling these distortions. The modulator 120 generally produces second order distortion unless biased at the correct operating point. The modulator generated second order distortion may be used to cancel the second order distortion from the joint modulation of both the laser 110 and the modulator 120 when the modulator 120 is biased such that the modulator second order distortion is in counter-phase to the distortion that stems from the joint modulation.

By way of a simplified example, a tone with a frequency f is provided as the input signal 160. At that frequency f, the laser modulation index (m_laser(f)) required to cancel the FM is given by m_laser(f)=m_mod(f)*0.1, with a phase relation phase_m_laser(f)=phase_m_mod(f).

By setting the phase_m_mod(f) arbitrarily to zero and with m_mod(f) essentially frequency independent, the optical output signal of the laser is $P_{las\_out}(t)=P_{laser}*(1+m\_laser(f)*cos(2*\pi*f*t))$. The output signal of the modulator is $P_{mod\_out}(t)=P_{las\_out}(t)*(1+m\_mod*cos(2*\pi*f*t))$. Continuing to solve for $P_{mod\_out}(t)$ results in the following:

Substituting for $P_{las\_out}(t)$: $P_{mod\_out}(t)=P_{laser}*(1+m\_laser(f)*cos(2*\pi*f*t))*(1+m\_mod*cos(2*\pi*f*t))$ Multiplying the terms out: $P_{mod\_out}(t)=P_{laser}*(1+(m\_laser+m\_mod)*cos(2*\pi*f*t)+m\_laser*m\_mod*cos(2*\pi*f*t)^2)$.

Using $a=m\_mod, 0.1a=m\_laser$ and $w=2*\pi*f$: $P_{mod\_out}(t)=P_{laser}*(1+1.1a*cos(wt)+0.1*a^2*(0.5+0.5*cos(2\ wt)))$.

The term with cos(2 wt) is an unwanted second order distortion frequency with an amplitude that is 0.5% of that of the wanted signal (cos(wt) term) for an example value of a=0.1. In an analog optical transmission system distortions are typically kept under 0.1%. Accordingly, the pre-distorter circuit 140 is used to cancel this distortion. Alternatively, or in combination, the modulator is biased such that it is not in the center of its S-curve such that it generates even order distortion that cancels this distortion.

The modulator 120 (like most practical external modulators) may produce a large amount of uneven distortion terms, such that $P_{mod\_out}(t)=P_{las\_out}(t)*(1+a*cos(2*\pi*f*t)+a_3*a^3*cos(2*\pi*f*t)^3+a_5*a^5*cos(2*\pi*f*t)^5+a_7*a^7*cos(2*\pi*f*t)^7 \ldots )$. These terms will also interact with the signal content in $P_{las\_out}(t)$ and the output spectrum will thus contain $2^{nd}, 3^{rd}, 4^{th}, 5^{th}, 6^{th}, 7^{th}, 8^{th}$ order distortions and so on. However in practice $a_3*a^3, a_5*a^5, a_7*a^7 \ldots$ are relatively small such that many of the even order products containing $a_3, a_5$ or $a_7$ have a magnitude under 0.1% and need not be handled by the pre-distorter circuit 140. However, the pre-distorter circuit 140 should preferably be able to handle both even and uneven order distortion components.

The optical transmitter 200 can modulate the optical signal with very low FM output. However in some cases a transmission system may still encounter problems associated with FM. For instance when very high transmit powers are used the transmission over the optical fiber 190 can cause self-phase modulation (PM) of the optical signal on the fiber 190 when power densities are so high that the refractive index of the glass responds to the optical signal. This self-PM in effect presents itself as FM with the associated detrimental effects. In these instances a pre-determined amount of FM generated by the optical transmitter (in the laser 110) to offset the FM (e.g., self-PM) encountered in the transmission system would be desirable.

The FM (self-PM) produced due to such a fiber non-linearity may have a different signature than the FM produced based on the optical transmitter modulation. That is, the FM required to cancel the self-PM may not be capable of being generated based on the input signal 160 or adjusted input signal (output of the level controller 210) alone.

Figure 3:
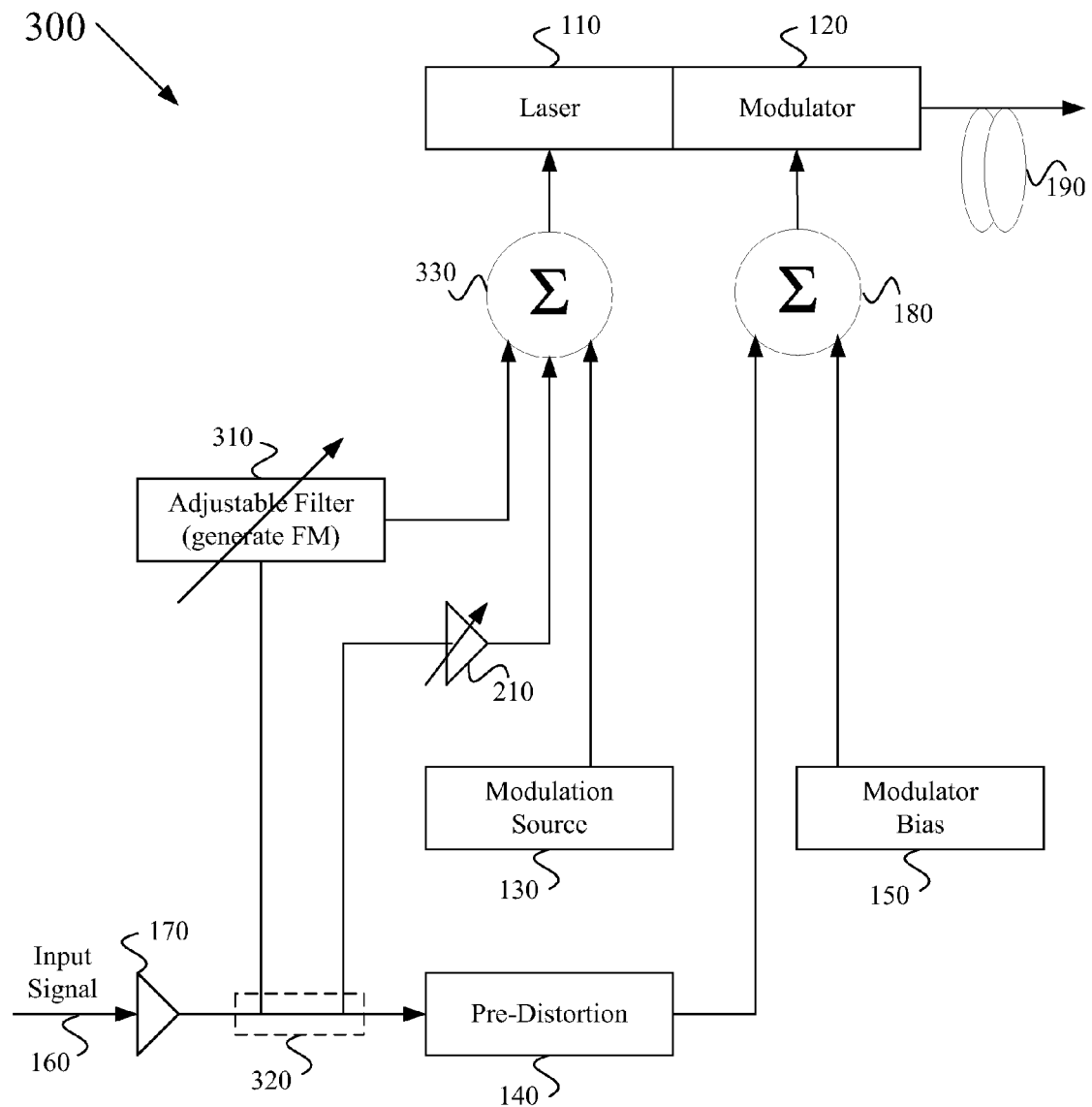
FIG. 3 illustrates a block diagram of an example externally modulated optical transmitter with chirp control and desired FM creation, according to one embodiment.

FIG. 3 illustrates a block diagram of an example externally modulated optical transmitter with chirp control and desired FM creation 300. The optical transmitter 300 includes the laser 110, the modulator 120, the modulation source 130, the pre-distortion circuit 140, the modulator bias circuit 150, the level controller 210, and an adjustable filter 310. The adjustable filter 310 is to provide signals to the laser 110 that generate a desired FM response from the transmitter 300 to counter the FM (e.g., self-PM) encountered in the transmission system. For example, if the desired output is a PM signal, the FM response provided by the adjustable filter 310 has an amplitude proportional to frequency. In case the amount of such PM is large then the pre-distortion circuit 140 should preferably have a means to generate a second order distortion profile with this same behavior.

The adjustable filter 310 may receive the input signal 160. The input signal 160 may be initially provided to the amplifier 170. The second path for the input signal 160 to the laser 110 may include two sub-paths. A first sub-path is via the level controller 210 and a second sub-path is via the adjustable filter 310. Each of the sub-paths (output of level controller 210, output of adjustable filter 310) and the output of the modulation source 130 are combined, for example by a summer 330, and the resulting combination is provided as an input (e.g., control signal) to the laser 110. The optical transmitter 300 may include a splitter 320 to provide the input signal 160 to the first path, the first sub-path of the second path, and the second sub-path of the second path.

According to one embodiment, the pre-distortion circuit 140 may be divided into two portions. A first portion would be frequency independent as it currently is and receive the input signal 160 as a flat signal (no frequency). A second portion would be frequency dependent and would receive the input signal 160 including frequency. The frequency of the signal would control the uneven distortion orders generated. The second portion may include a level controller to filter the input signal 160 for certain frequencies.

Figure 4:
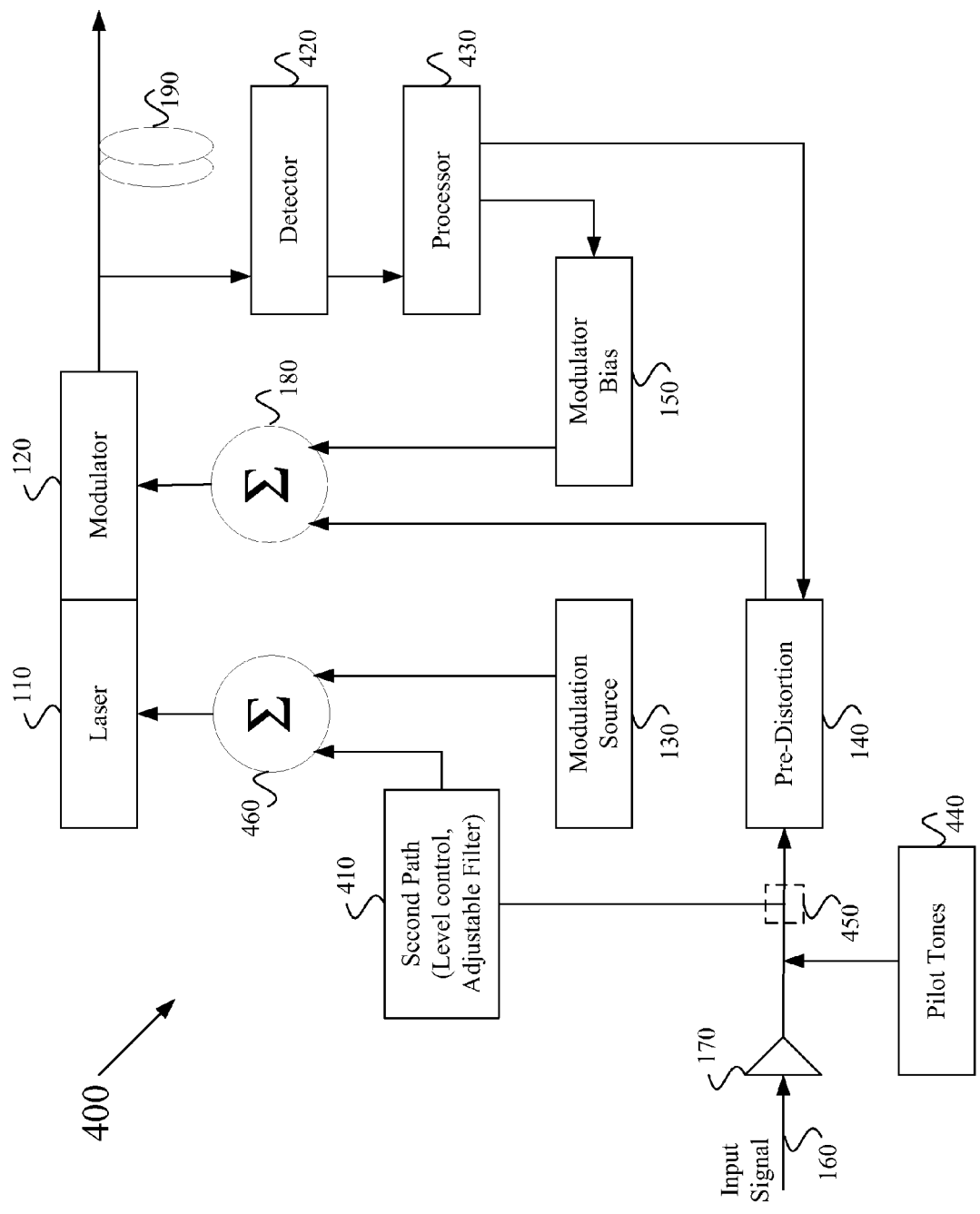
FIG. 4 illustrates a block diagram of an example externally modulated optical transmitter with enhanced distortion control, according to one embodiment.

Additional features may be included in an optical transmitter (e.g., 200, 300) for providing enhanced distortion control. FIG. 4 illustrates a block diagram of an example externally modulated optical transmitter with enhanced distortion control 400. The optical transmitter 400 includes the laser 110, the modulator 120, the modulation source 130, the pre-distortion circuit 140, the modulator bias circuit 150, and a path (second path) 410 for the input signal 160 to be provided to the laser 110. The second path 410 may include a level controller 210 and an adjustable filter 310. The optical transmitter 400 may also include a detector 420, a signal processor 430, and pilot tones 440. The detector 420 may be coupled to the fiber 190 to capture the optical output of the transmitter 400. The processor 430 is to monitor parameters of the optical output captured by the detector, such as such as output power, and second and higher order distortion content and to derive control signals to adjust the pre-distortion circuit 140 and/or the modulator bias circuit 150 such that the distortion in the transmitter output is minimized. The pilot tones 440 can be added to the input signal 160 in order to facilitate distortion detection by the processor 430.

The optical transmitter 400 may include a splitter 450 to provide the input signal 160 to a first path (to the modulator 120 via the pre-distortion circuit 140 and the summer 180) and the second path 410. The output of the second path 410 and the output of the modulation source 130 are combined, for example by a summer 460, and the resulting combination is provided as an input (e.g., control signal) to the laser 110.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. An optical transmitter comprising
 a laser to generate an optical output;
 an optical modulator to modulate the optical output using amplitude modulation (AM) for transmission over a fiber cable;
 a modulator bias circuit to adjust a bias point of the optical modulator to reduce at least a portion of distortion created in the optical transmitter;
 a first path to provide an RF input signal, via a pre-distortion circuit, to a first combining circuit for combining an output of the pre-distortion circuit with an output of the modulator bias circuit, such that an output of the first combining circuit is provided as an input to the optical modulator, wherein the optical modulator is to generate the AM based on the RF input signal, and wherein the optical modulator also generates frequency modulation (FM) based on the RF input signal;
 a modulation source for adding FM to the optical output of the laser to suppress Stimulated Brillouin Backscattering (SBS); and
 a second signal path to provide the RF input signal to a second combining circuit for combining the RF input signal with an output of the modulation source, such that an output of the second combining circuit is provided as an input to the laser, wherein the laser is to generate FM to counteract the FM of the modulator.

2. The optical transmitter of claim 1, wherein the second signal path includes a level shifter to adjust the RF input signal provided to the laser in order to attain a desired amount of FM from the laser.

3. The optical transmitter of claim 2, wherein the level shifter is to adjust the amplitude of the RF input signal.

4. The optical transmitter of claim 2, wherein the level shifter is to invert the RF input signal.

5. The optical transmitter of claim 2, wherein the level shifter is to adjust phase of the RF input signal to align phase of the FM generated by the laser with FM generated by the optical modulator.

6. The optical transmitter of claim 2, wherein the level shifter is to filter frequency of the RF input signal.

7. The optical transmitter of claim 1, wherein the pre-distortion circuit is configured to generate distortion orders to cancel at least a portion of distortion created in the transmitter.

8. The optical transmitter of claim 7, wherein the pre-distortion circuit is configured to cancel at least a second order distortion.

9. The optical transmitter of claim 7, wherein the pre-distortion circuit is configured to cancel at least one or more uneven distortion terms.

10. The optical transmitter of claim 1, wherein the modulator bias circuit is set to reduce even order distortions.

11. The optical transmitter of claim 1, wherein the modulator bias circuit is set to reduce second order distortion due to joint modulation of the laser and the optical modulator.

12. The optical transmitter of claim 1, further comprising an adjustable filter to provide signals to the laser to generate FM signals from the transmitter to optimize system performance.

13. The optical transmitter of claim 12, wherein the adjustable filter is adjustable in amplitude, phase, or frequency.

14. An optical transmitter comprising
 a laser configured to generate an optical output;
 an optical modulator configured to modulate the optical output using amplitude modulation (AM) for transmission over a fiber cable;
 an input configured to receive an RF input signal;
 a pre-distortion circuit configured to receive the RF input signal and to generate distortion orders that compensate for an S-curve of the optical modulator;
 a modulator bias circuit configured to set the bias point of the optical modulator at a center of the S-curve;
 a modulation source for adding frequency modulation (FM) to the optical output of the laser to suppress Stimulated Brillouin Backscattering (SBS);
 a level shifter configured to adjust the RF input signal provided to the optical transmitter in order to attain a desired amount of FM from the laser that cancels FM generated in the optical modulator;
 a first combining circuit configured to combine an output of the pre-distortion circuit with an output of the modulator bias circuit, such that an output of the first combining circuit is provided as an input to the optical modulator; and
 a second combining circuit configured to combine an output of the level shifter with an output of the modulation source, such that an output of the second combining circuit is provided as an input to the laser.

15. The optical transmitter of claim 14, wherein the level shifter is configured to adjust the RF input signal including at least some subset of adjusting the amplitude, inverting, adjusting phase, or filtering by frequency.

16. The optical transmitter of claim 14, wherein the pre-distortion circuit is configured to generate distortion orders to cancel at least a portion of distortion created in the transmitter.

17. The optical transmitter of claim 14, wherein the modulator bias circuit is configured to adjust a bias point of the optical modulator to reduce at least a portion of distortion created in the transmitter.

18. The optical transmitter of claim 14, further comprising an adjustable filter to provide signals to the laser to generate FM signals from the transmitter to optimize system performance.

19. The optical transmitter of claim 14, further comprising a processor to monitor parameters of the optical output, such as output power, and second and higher order distortion content; and to derive control signals to adjust at least one of the pre-distortion circuit and the modulator bias circuit such that the distortion in the transmitter output is minimized.

\* \* \* \* \*